US011370271B2

(12) United States Patent
Durrani et al.

(10) Patent No.: US 11,370,271 B2
(45) Date of Patent: Jun. 28, 2022

(54) DEVICE FOR AN AIR CONDITIONING SYSTEM OF A MOTOR VEHICLE AND METHOD FOR OPERATING THE DEVICE

(71) Applicant: Hanon Systems, Daejeon (KR)

(72) Inventors: Navid Durrani, Kerpen (DE); Toni Spies, Cologne (DE); Tobias Haas, Cologne (DE)

(73) Assignee: HANON SYSTEMS, Daejeon (KR)

( * ) Notice: Subject to any disclaimer, the term of this patent is extended or adjusted under 35 U.S.C. 154(b) by 305 days.

(21) Appl. No.: 16/665,211

(22) Filed: Oct. 28, 2019

(65) Prior Publication Data

US 2020/0130472 A1   Apr. 30, 2020

(30) Foreign Application Priority Data

Oct. 30, 2018   (DE) .......................... 102018127108.5

(51) Int. Cl.
*B60H 1/32*   (2006.01)

(52) U.S. Cl.
CPC ........... *B60H 1/3223* (2013.01); *B60H 1/323* (2013.01); *B60H 1/32281* (2019.05); *B60H 1/32284* (2019.05); *B60H 2001/3291* (2013.01)

(58) Field of Classification Search
CPC .. B60H 1/3222; B60H 1/3223; B60H 1/3228; B60H 1/32281; B60H 1/32284; B60H 1/323; B60H 2001/3291; F25B 1/10
See application file for complete search history.

(56) References Cited

U.S. PATENT DOCUMENTS

| 5,706,667 | A | * | 1/1998 | Iritani ................ B60H 1/00828 165/244 |
| 5,878,589 | A | | 3/1999 | Tanaka et al. |
| 6,293,123 | B1 | | 9/2001 | Iritani et al. |
| 6,318,116 | B1 | * | 11/2001 | Gabel .................... B60H 1/323 62/475 |
| 6,347,528 | B1 | * | 2/2002 | Iritani .................. B60L 3/0046 62/324.6 |

(Continued)

FOREIGN PATENT DOCUMENTS

DE   69908716 T2   1/2004
DE   60031808 T2   9/2007
(Continued)

*Primary Examiner* — Miguel A Diaz
(74) *Attorney, Agent, or Firm* — Shumaker, Loop & Kendrick, LLP; James D. Miller (57) ABSTRACT

Device for a climate control system of a motor vehicle. The device includes a refrigeration circuit with a compressor for the two-stage compression of the refrigerant and injection of refrigerant at an intermediate pressure level, at least one heat exchanger operated as a condenser/gas cooler, a first internal heat exchanger, at least a first heat exchanger operated as an evaporator, which is situated upstream from a first expansion element in the flow direction of the refrigerant, as well as a first flow path and a second flow path, each of which extends from a branching point to the compressor. The refrigeration circuit is designed with a second internal heat exchanger. The first internal heat exchanger is arranged at least with a low-pressure side inside the first flow path and the second internal heat exchanger is arranged at least with an intermediate pressure side inside the second flow path.

23 Claims, 5 Drawing Sheets

(56) References Cited

U.S. PATENT DOCUMENTS

| | | | |
|---|---|---|---|
| 7,331,196 B2 * | 2/2008 | Itsuki | F25B 9/008 62/510 |
| 2004/0255609 A1 * | 12/2004 | Aflekt | F25B 9/008 62/498 |
| 2010/0281901 A1 * | 11/2010 | Kawase | F25B 25/005 62/238.7 |
| 2012/0227427 A1 * | 9/2012 | Liu | F25B 1/10 62/115 |
| 2012/0266622 A1 * | 10/2012 | Inaba | F25B 1/10 62/186 |
| 2013/0306302 A1 * | 11/2013 | Osaka | B60H 1/00385 165/287 |
| 2015/0151609 A1 * | 6/2015 | Satou | F25B 5/02 165/63 |
| 2016/0185186 A1 * | 6/2016 | Miyakoshi | B60H 1/3213 62/160 |
| 2016/0201959 A1 * | 7/2016 | Miyakoshi | F25B 31/008 62/155 |
| 2016/0201960 A1 * | 7/2016 | Miyakoshi | F25B 49/02 62/154 |
| 2016/0236538 A1 * | 8/2016 | Suzuki | F25B 5/04 |
| 2016/0236539 A1 * | 8/2016 | Suzuki | B60H 1/2221 |
| 2017/0106725 A1 * | 4/2017 | Kim | B60H 1/00278 |
| 2017/0197490 A1 * | 7/2017 | Enomoto | B60H 1/00485 |

FOREIGN PATENT DOCUMENTS

| | | |
|---|---|---|
| DE | 102006035784 A1 | 2/2008 |
| DE | 60221860 T2 | 4/2008 |
| DE | 102010042127 A1 | 4/2012 |
| DE | 112014004619 T5 | 7/2016 |
| JP | 2000046420 A | 2/2000 |
| JP | 2005502022 A | 1/2005 |
| JP | 2008039383 A | 2/2008 |
| JP | 2015074274 A | 4/2015 |

* cited by examiner

Prior art

FIG. 1A

Prior art

DEVICE FOR AN AIR CONDITIONING SYSTEM OF A MOTOR VEHICLE AND METHOD FOR OPERATING THE DEVICE

CROSS-REFERENCE TO RELATED APPLICATIONS

This patent application claims priority to German Patent Application Ser. No. 10 2018 127 108.5 filed on Oct. 30, 2018, the disclosure of which is incorporated herein by reference in its entirety.

FIELD

The invention relates to a device for a climate control system of a motor vehicle. The device comprises a refrigeration circuit with a compressor for the two-stage compression of the refrigerant and injection of refrigerant at an intermediate pressure level, a heat exchanger operated as a condenser/gas cooler, an internal heat exchanger, a heat exchanger operated as an evaporator with an expansion element situated upstream in the flow direction of the refrigerant, as well as a first and a second flow path, each of which extends from a branching point to the compressor.

The invention furthermore relates to a method for operating the device for a climate control system of a motor vehicle.

BACKGROUND

Systems with refrigeration circuits having a two-stage compression of the refrigerant, in which refrigerant at an intermediate pressure level is injected into the compressor, are known from the prior art. The so-called suction gas injection or vapor injection is used especially in scroll compressors in refrigeration circuits of climate control systems and cooling systems. With the injection of the refrigerant, the compression process is divided into two stages, where the second stage occurs after the injection of the refrigerant at intermediate pressure level.

With the suction gas injection in conjunction with a supercooling of the refrigerant at the outlet of a condenser/gas cooler, on the one hand the specific compressor performance is reduced and on the other hand the vapor content at the inlet of the evaporator is decreased, which increases both the specific cooling capacity and the COP or "coefficient of performance" during the operation of the refrigeration circuit.

Thermodynamically speaking, the technology of suction gas injection offers advantages in particular in applications where the pressure ratio or the pressure stroke of the refrigerant or the temperature of the refrigerant at the outlet of the compressor are very high, for example, in systems for low temperature cooling or in heat pump systems. The additional cooling in the process of compressing the refrigerant on account of the injecting of refrigerant at intermediate pressure level into the compressor makes it possible to operate the compressor in a larger pressure range or temperature range than a conventional single-stage compressor.

In U.S. Pat. No. 5,878,589 A, a climate control system for motor vehicles with electric drive is disclosed. During operation in the heating mode, the refrigerant is circulated in a closed refrigeration circuit of a compressor between a heat exchanger of an air conditioner operated as a condenser, an expansion element and an external heat exchanger operated as an evaporator. In the expansion element, the refrigerants expanded to a low-pressure level. After emerging from the condenser, a partial mass flow is branched off from the main mass flow of the refrigerant, expanded to an intermediate pressure level and taken to a heat exchanger for temperature control of components, in which the refrigerant is evaporated by taking up heat. The evaporated refrigerant is introduced into the compressor across an evaporation pressure regulating valve and a gas inlet duct at intermediate pressure level.

From U.S. Pat. No. 6,293,123 B1 there appears a refrigeration circuit for a climate control system of a motor vehicle. During the operation in heating mode, the refrigerant at high pressure level is taken through a condenser situated inside an air conditioner and then divided into two partial mass flows. A first partial mass flow moves through a first expansion element and is expanded to an intermediate pressure level.

After this, in an internal heat exchanger, heat from the second partial mass flow at high pressure level is transferred to the first partial mass flow at intermediate pressure level. The supercooled refrigerant of the second partial mass flow is expanded inside a second expansion element to a low-pressure level and evaporated in an external heat exchanger.

The problem which the invention proposes to solve is to provide a device for a climate control system of a motor vehicle, such as for motor vehicles with an electric or combination electric and combustion engine drive, having in particular the benefits of a refrigeration circuit with two-stage compression with suction gas injection at intermediate pressure level. The system should be able to operate with maximum efficiency and maximum performance. Furthermore, one problem which the invention proposes to solve is to provide a method for operating the device.

SUMMARY

The problem is solved by the subject matter with the features disclosed herein.

The problem is solved by a device for a climate control system of a motor vehicle. The device comprises a refrigeration circuit with a compressor for the two-stage compression of the refrigerant and injection of refrigerant at an intermediate pressure level. The refrigeration circuit is furthermore formed with at least one heat exchanger operated as a condenser/gas cooler, a first internal heat exchanger, at least a first heat exchanger operated as an evaporator, which is situated upstream from a first expansion element in the flow direction of the refrigerant, as well as a first flow path and a second flow path. The flow paths each extend from a branching point to the compressor, especially to an inlet into the compressor.

According to the concept of the invention, the refrigeration circuit is designed with a second internal heat exchanger. The first internal heat exchanger is arranged at least with a low pressure side inside the first flow path in the flow direction of the refrigerant upstream from an inlet into the compressor and the second internal heat exchanger is arranged at least with an intermediate pressure side inside the second flow path in the flow direction of the refrigerant upstream from an inlet into the compressor.

By an internal heat exchanger is meant a heat exchanger internal to the circuit, which serves for the heat transfer between the refrigerant at a high pressure, especially at a high pressure level, and the refrigerant at a lower pressure, especially at a low pressure level or an intermediate pressure level. For example, on the one hand the liquid refrigerant after the condensation/gas cooling is supercooled or further cooled down, and on the other hand the suction gas upstream from the compressor is overheated.

When the refrigerant in subcritical operation of the particular refrigeration circuit, such as when it is liquefied with the refrigerant R134a or with carbon dioxide under certain ambient conditions, the heat exchanger is known as a condenser. A portion of the heat transfer occurs at constant temperature. In supercritical operation or during supercritical heat transfer in the heat exchanger, the temperature of the refrigerant steadily decreases. In this case, the heat exchanger is also known as a gas cooler. Supercritical operation may occur under certain ambient conditions or operating modes of the refrigeration circuit, for example with carbon dioxide as the refrigerant.

According to one modification of the invention, the first heat exchanger of the refrigeration circuit operated as an evaporator and the first expansion element situated upstream from the heat exchanger in the flow direction of the refrigerant are formed inside the first flow path. The first heat exchanger operated as an evaporator is situated upstream from the low-pressure side of the first internal heat exchanger in the flow direction of the refrigerant.

The refrigeration circuit is advantageously formed with a second heat exchanger operated as an evaporator, upstream from which an expansion element is situated in the flow direction of the refrigerant.

According to a first alternative embodiment of the invention, the second heat exchanger of the refrigeration circuit operated as an evaporator and the expansion element situated upstream from the heat exchanger in the flow direction of the refrigerant are formed inside the second flow path. The second heat exchanger operated as an evaporator is situated upstream from the intermediate pressure side of the second internal heat exchanger in the flow direction of the refrigerant.

According to a second alternative embodiment of the invention, the first heat exchanger operated as an evaporator and the first expansion element situated upstream from the heat exchanger in the flow direction of the refrigerant as well as the second heat exchanger operated as an evaporator and the expansion element situated upstream from the heat exchanger in the flow direction of the refrigerant are formed inside the first flow path of the refrigeration circuit. Furthermore, the first heat exchanger operated as an evaporator is situated upstream from the low-pressure side of the first internal heat exchanger in the flow direction of the refrigerant. An expansion element is advantageously formed inside the second flow path of the refrigeration circuit.

According to another first alternative embodiment of the invention, the branching point of the flow paths of the refrigeration circuit at an outlet of the heat exchanger operated as a condenser/gas cooler is provided such that a high pressure side of the first internal heat exchanger is situated inside the first flow path and a high pressure side of the second internal heat exchanger is situated inside the second flow path of the refrigeration circuit.

According to a second alternative embodiment of the invention, the branching point of the flow paths of the refrigeration circuit is situated downstream from outlets of high-pressure sides of the first internal heat exchanger and the second internal heat exchanger. It is of particular advantage for a first branching point situated on an outlet of the heat exchanger operated as a condenser/gas cooler and a discharge point situated downstream from the first branching point in the flow direction of the refrigerant to be designed such that a first partial mass flow is taken to the high pressure side of the first internal heat exchanger and a second partial mass flow is taken to the high pressure side of the second internal heat exchanger, which are merged after flowing out from the internal heat exchangers at the discharge point. A second branching point of the flow paths is situated downstream from the discharge point in the flow direction of the refrigerant.

According to one advantageous embodiment of the invention, an accumulator for separating and collecting the refrigerant liquid is provided inside the first flow path of the refrigeration circuit at the low-pressure side, upstream from the compressor in the flow direction of the refrigerant.

The refrigeration circuit preferably comprises an oil separator, which is formed between the first flow path and the second flow path. The oil separator is preferably designed with an integrated valve for regulating the pressure and flow rate of the oil.

According to one modification of the invention, the device comprises at least one coolant circuit, which is thermally connected to the refrigeration circuit across at least one heat exchanger. The at least one heat exchanger is designed as a refrigerant/coolant heat exchanger.

According to a first alternative embodiment of the invention, the device comprises a first coolant circuit, which is thermally connected to the refrigeration circuit across the heat exchanger operated as the condenser/gas cooler of the refrigerant and is designed as a refrigerant/coolant heat exchanger.

According to a first alternative embodiment of the invention, a first coolant circuit comprises a primary first coolant circuit and a secondary first coolant circuit, which are each thermally connected across a heat exchanger operated as a condenser/gas cooler of the refrigerant to the refrigeration circuit and each designed as a refrigerant/coolant heat exchanger. The first coolant circuit comprises two interconnected or two mutually independent coolant circuits with the primary and the secondary coolant circuit.

The first coolant circuit is designed with a coolant/air heat exchanger for transfer of heat to surrounding air or to intake air for a passenger compartment of the motor vehicle. Furthermore, or alternatively, the first coolant circuit may comprise at least one heat exchanger for the transfer of heat to a battery and/or other electronic components, such as the drive train of the motor vehicle.

A further preferred embodiment of the invention consists in that a second coolant circuit is formed, which is thermally connected to the refrigeration circuit across the heat exchanger operated as the first evaporator of the refrigerant and/or a heat exchanger operated as the second evaporator of the refrigerant. The heat exchanger operated as the first evaporator of the refrigerant and/or the heat exchanger operated as the second evaporator of the refrigerant are designed as a refrigerant/coolant heat exchanger.

The second coolant circuit preferably comprises two interconnected or two mutually independent coolant circuits with a primary and a secondary coolant circuit.

According to another advantageous embodiment of the invention, the second coolant circuit is designed with a coolant/air heat exchanger for transfer of heat from surrounding air or intake air for a passenger compartment to the coolant. Furthermore, or alternatively, the second coolant circuit may comprise at least one heat exchanger for the transfer of heat from a battery and/or other electronic components, such as the drive train of the motor vehicle, to the coolant.

The problem is also solved by a method according to the invention for operating the device for a climate control system of a motor vehicle. The climate control system can be designed to condition the air of a passenger compartment and to control the temperature of components of the drive train of the motor vehicle. In the method, refrigerant circulating in a refrigeration circuit is compressed in a compressor in two stages from a low-pressure level to a high-pressure level, wherein a partial mass flow of vaporous refrigerant at an intermediate pressure level is injected into the compressor.

According to the concept of the invention, the refrigerant flowing out from a heat exchanger operated as a condenser/gas cooler is divided into two partial mass flows at a branching point, wherein each time a partial mass flow of the refrigerant present at high pressure level is taken through a first internal heat exchanger and a second internal heat exchanger. Heat is transferred in the first internal heat exchanger to refrigerant present at the low-pressure level and heat is transferred in the second internal heat exchanger to refrigerant present at the intermediate pressure level.

According to a first alternative embodiment of the invention, the refrigerant taken through the first internal heat exchanger as the first partial mass flow at high pressure level is expanded to low pressure level and upon flowing through a first heat exchanger operated as an evaporator it is evaporated, taking up heat, and then it is taken through the first internal heat exchanger.

The refrigerant taken through the second internal heat exchanger as the second partial mass flow at high pressure level is advantageously expanded to intermediate pressure level and upon flowing through a second heat exchanger operated as an evaporator it is evaporated, taking up heat, and then it is taken through the second internal heat exchanger.

According to a second alternative embodiment of the invention, the refrigerant flowing out from the internal heat exchangers as partial mass flows at high pressure level is mixed and then divided at a branching point into two partial mass flows. A first partial mass flow is expanded to intermediate pressure level and at least partly evaporated, taking up heat, upon flowing through a second heat exchanger operated as an evaporator and then it is expanded to low pressure level and further evaporated, taking up heat, upon flowing through a first heat exchanger operated as an evaporator and then it is taken through the first internal heat exchanger.

According to a third alternative embodiment of the invention, the refrigerant flowing out from the internal heat exchangers as partial mass flows at high pressure level is mixed and then divided at a branching point into two partial mass flows. A first partial mass flow is expanded to low pressure level and evaporated, taking up heat, upon flowing through heat exchangers operated as an evaporator and then it is taken through the first internal heat exchanger.

A second partial mass flow is expanded to intermediate pressure level and then taken through the second internal heat exchanger.

According to one modification of the invention, when the climate control system is operated in a heating mode, at least one heating capacity is provided. Heat from the refrigerant of the refrigeration circuit is transferred in at least one refrigerant/coolant heat exchanger operated as a condenser/gas cooler to a coolant circulating in a first coolant circuit and heat from the coolant of the first coolant circuit is transferred in a coolant/air heat exchanger to an intake air for the passenger compartment and/or heat is transferred to components of the drive train.

According to one advantageous embodiment of the invention, when the climate control system is operated in a refrigeration mode at a low temperature level, a cooling capacity is provided. Heat from a coolant circulating in a second coolant circuit is transferred in a refrigerant/coolant heat exchanger operated as an evaporator to the refrigerant of the refrigeration circuit and heat from an intake air for the passenger compartment is transferred in a coolant/air heat exchanger to the coolant of the second coolant circuit.

According to another preferred embodiment of the invention, when the climate control system is operated in a refrigeration mode at a medium or low temperature level, a cooling capacity is provided. Heat from a coolant circulating in a second coolant circuit is transferred in a refrigerant/coolant heat exchanger operated as an evaporator to the refrigerant of the refrigeration circuit and heat from components of the drive train is transferred to the coolant of the second coolant circuit.

In this way, electrical components of a drive train, especially of a motor vehicle with an electrical or a combined electrical and combustion engine drive, such as a high-voltage battery and an inverter, can be temperature-controlled with coolant at a medium temperature level, so that the consumption of electrical energy, such as the consumption of the compressor of the refrigeration circuits, is minimized and the efficiency of the overall system is increased.

In summary, the device according to the invention and the method according to the invention have diverse benefits:

providing of high heating capacities, especially cooling capacities or heating performance, at different temperature levels, high system performance with maximum service life, especially since the compressor is operated with favorable compression ratios per compression stage, also at high power, thanks to providing coolant at medium and low temperature levels, the high-voltage battery and other components of the drive train can be cooled to a medium temperature level during operation in the refrigeration mode, instead of using the coolant at low temperature level which is intended for cooling the intake air of the passenger compartment, and maximum efficiency and maximum power during the operation of the system.

DRAWINGS

Further details, features and benefits of the invention will emerge from the following description of exemplary embodiments making reference to the accompanying drawings. There are shown.

DETAILED DESCRIPTION

Figure 1A:
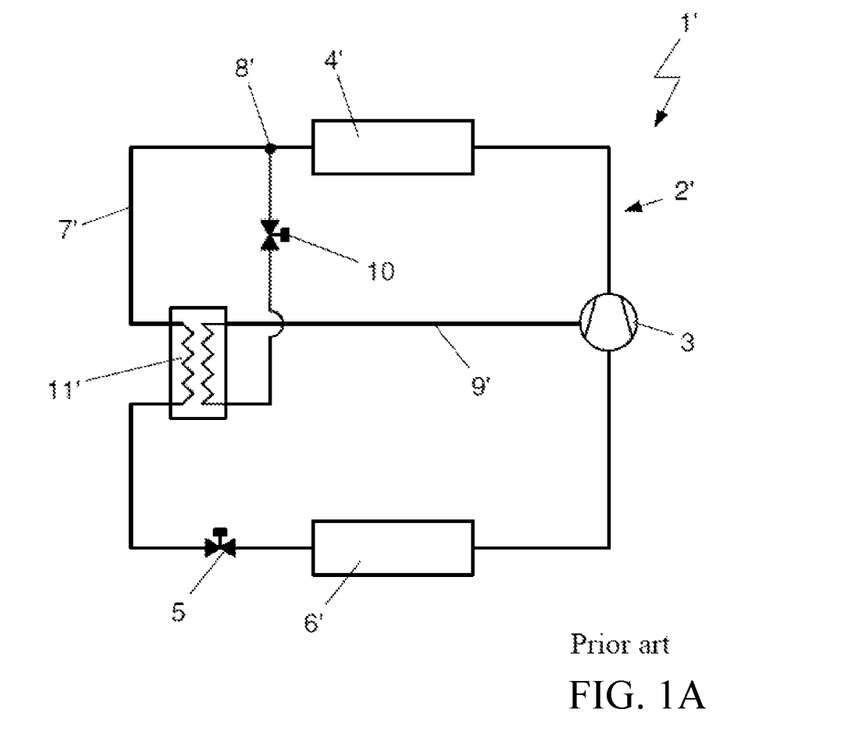
FIG. 1A: a refrigeration circuit for a climate control system of a motor vehicle with two-stage compression of the refrigerant in combination with an internal heat exchanger of the prior art, in which the refrigerant at an intermediate pressure level is injected into the compressor.
Figure 1B:
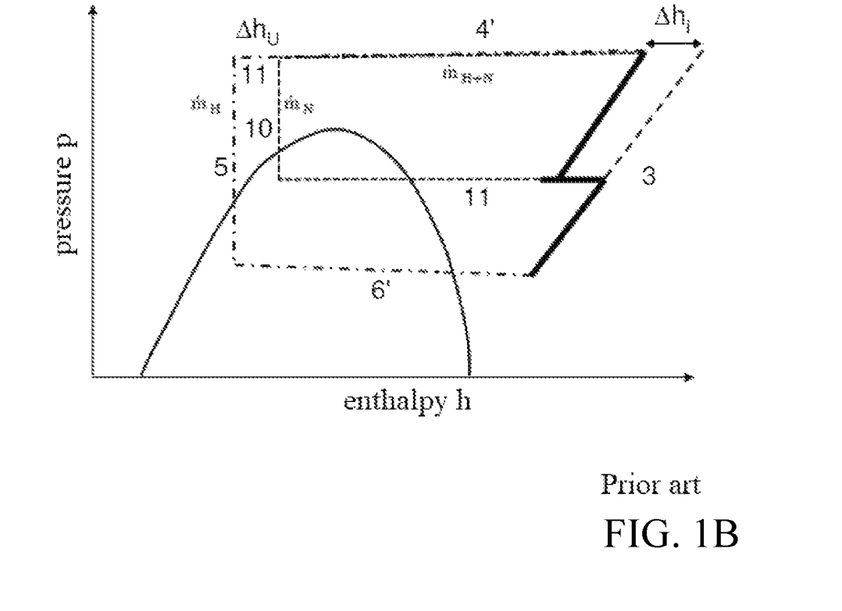
FIG. 1B: a pressure vs. enthalpy diagram for the operation of the refrigeration circuit of FIG. 1A in a transcritical process of the refrigerant.

FIG. 1A shows a refrigeration circuit 2' for a device 1', such as a climate control system of a motor vehicle, with two-stage compression of the refrigerant in combination with an internal heat exchanger 11' from the prior art, in which the refrigerant is injected at an intermediate pressure level into the compressor 3. FIG. 1B shows a pressure vs. enthalpy diagram for the operation of the refrigeration circuit 2' of FIG. 1A in a transcritical process of the refrigerant. The changes in state represented in FIG. 1B are respectively coordinated with the reference numbers of the components of the refrigeration circuit 2', in order to illustrate the cyclical process.

The refrigeration circuit 2' comprises, in the flow direction of the refrigerant, a compressor 3, a heat exchanger 4' operated as a condenser/gas cooler, and a first expansion element 5 with a following heat exchanger 6' operated as an evaporator for the refrigerant. The evaporator 6' as well as the corresponding first expansion element 5 situated upstream from the evaporator 6' in the flow direction of the refrigerant are arranged internally in a first flow path 7', which extends from a branching point 8' to the inlet of the compressor 3. The branching point 8' is located downstream from the outlet of the condenser/gas cooler 4'.

At the branching point 8', the liquid refrigerant emerging from the condenser/gas cooler 4' at high pressure level is divided into two partial mass flows. A first partial mass flow mH flows through the first flow path 7' to the first expansion element 5. Between the branching point 8' and the first expansion element 5 is situated a high pressure side of an internal heat exchanger 11', so that the refrigerant of the first partial mass flow mH is cooled down or supercooled before reaching the first expansion element 5 and is then taken to the evaporator 6', expanded to a low pressure level. A second partial mass flow mN, branched off from the main mass flow mH+N at the branching point 8', flows through a second flow path 9', which comprises in the flow direction of the refrigerant a second expansion element 10 and an intermediate pressure side of the internal heat exchanger 11'. Upon flowing through the second expansion element 10, the refrigerant taken through the second flow path is expanded to the intermediate pressure level and then channeled into the internal heat exchanger 11'. In the internal heat exchanger 11', preferably designed as a counterflow heat exchanger and operated as a supercooler of the refrigerant of the first partial mass flow mH, heat is transferred from the refrigerant of the first partial mass flow mH at high pressure level to the refrigerant of the second partial mass flow mN at intermediate pressure level. The refrigerant of the second partial mass flow mN evaporates inside the internal heat exchanger 11'.

The supercooled refrigerant of the first partial mass flow mH is expanded inside the first expansion element 5 to the low-pressure level and evaporated in the evaporator 6', taking up heat. The refrigerant present at the intermediate pressure level is supplied as saturated or superheated vapor to the compressor 3, especially through an intermediate pressure port of the compressor 3, and injected into a compression chamber, which results in a decreasing of the enthalpy Δhi at the outlet of the compressor 3 and thus a lowering of the exit temperature of the refrigerant from the compressor 3. The additional supercooling ΔhU of the refrigerant of the first partial mass flow mH prior to the expansion and thus prior to the flowing into the evaporator 6' increases the specific cooling capacity of the evaporator 6', since the enthalpy of the refrigerant at the inlet to the evaporator 6' is decreased. During an operation of the refrigeration circuit 2' in a heating mode, the additional second partial mass flow mN increases the mass flow of the refrigerant through the condenser/gas cooler 4' and thus the heating capacity.

Figure 2A:
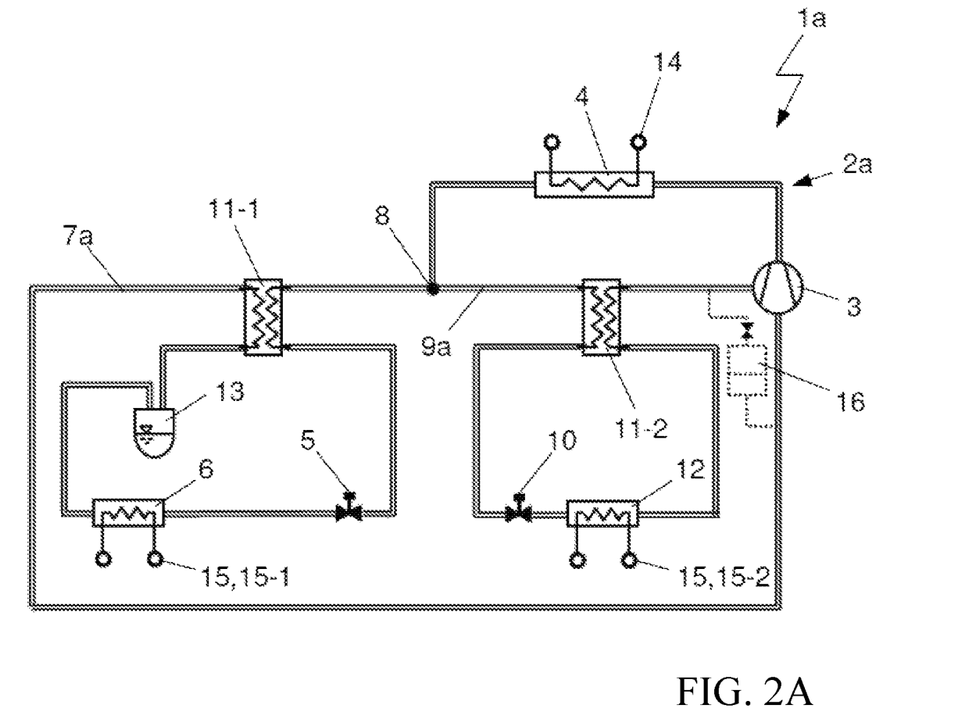
FIG. 2A: a device for a climate control system of a motor vehicle having a refrigeration circuit with two-stage compression and injection of the refrigerant into the compressor at an intermediate pressure level and having two internal heat exchangers and a first as well as a second coolant circuit, each of which is thermally connected across refrigerant/coolant heat exchangers to the refrigeration circuit.
Figure 2B:
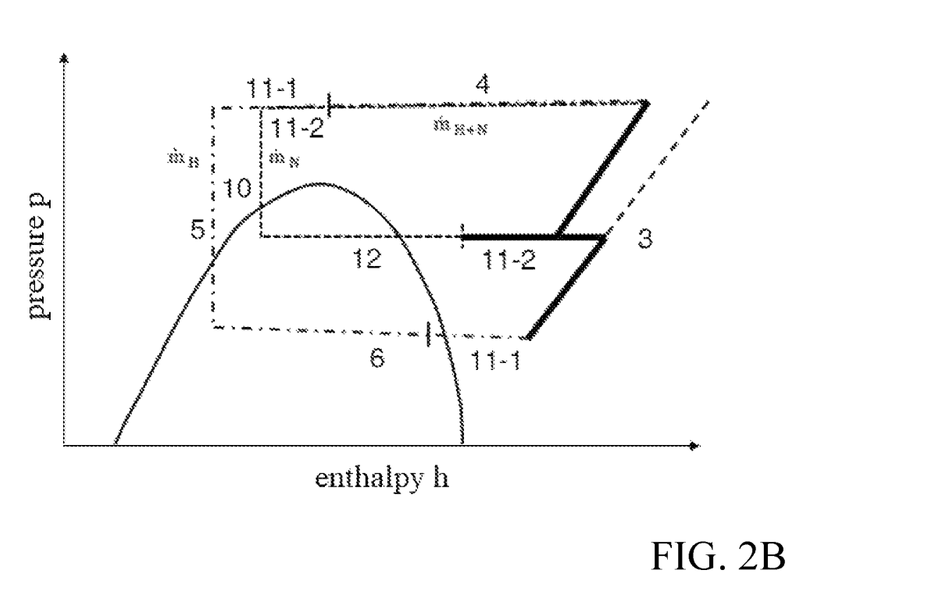
FIG. 2B: a pressure vs. enthalpy diagram for the operation of the refrigeration circuit of FIG. 2A in a transcritical process of the refrigerant.

FIG. 2A shows a device 1a for a climate control system of a motor vehicle having a refrigeration circuit 2a with two-stage compression and injection of the refrigerant into the compressor 3 at an intermediate pressure level as well as having two internal heat exchangers 11-1, 11-2. The device 1a furthermore comprises a first coolant circuit 14 and a second coolant circuit 15, which are respectively thermally connected across refrigerant/coolant heat exchangers 4, 6, 12 to the refrigeration circuit 2a and can be operated independently of each other. FIG. 2B shows a pressure vs. enthalpy diagram for the operation of the refrigeration circuit 2a of FIG. 2A in a transcritical process of the refrigerant.

The refrigeration circuit 2a comprises, in the flow direction of the refrigerant, the compressor 3 and a first refrigerant/coolant heat exchanger 4 operated as a condenser/gas cooler, which is designed as a thermal connection between the refrigeration circuit 2a and the first coolant circuit 14.

The first coolant circuit 14 is operated as a high temperature circuit, at which the desuperheating heat or the heat of condensation or the heat of liquefaction of the refrigerant is surrendered to a coolant. Depending on the operating mode of the device 1a, the heat transferred in the first refrigerant/coolant heat exchanger 4 to the coolant circulating in the first coolant circuit 14 is either transferred to the surrounding air or used for the heating of intake air for a passenger compartment, a battery, and/or electronic components, for example, of the drive train of the motor vehicle.

The refrigeration circuit 2a furthermore comprises, in the flow direction of the refrigerant, the first expansion element 5 with a following second refrigerant/coolant heat exchanger 6 operated as a first evaporator for the refrigerant, also called a chiller. The first evaporator 6 as well as the corresponding first expansion element 5 situated upstream from the first evaporator 6 in the flow direction of the refrigerant are situated inside a first flow path 7a, which extends from a branching point 8 to the inlet of the compressor 3. The branching point 8 is situated in the flow direction of the refrigerant downstream from the outlet of the first refrigerant/coolant heat exchanger 4.

At the branching point 8, the liquid refrigerant emerging from the condenser/gas cooler 4 at high pressure level is divided into two partial mass flows, the first partial mass flow mH flowing through the first flow path 7a to the first expansion element 5 and the second partial mass flow mN through the second flow path 9a to the second expansion element 10. The partial mass flows mH, mN are steered through the respective flow path 7a, 9a with the corresponding expansion elements 5, 10. The expansion elements 5, 10 are preferably designed as expansion valves.

Between the branching point 8 and the first expansion element 5 of the first flow path 7a is situated the high pressure side of a first internal heat exchanger 11-1, so that the refrigerant of the first partial mass flow mH is cooled down or supercooled before reaching the first expansion element 5 and is then expanded to low pressure level and supplied to the first evaporator 6. The additional supercooling of the refrigerant of the first partial mass flow mH prior to the expanding and thus prior to the flowing into the first evaporator 6 increases the specific cooling capacity of the first evaporator 6, since the enthalpy of the refrigerant at the inlet to the first evaporator 6 is decreased.

The supercooled refrigerant of the first partial mass flow mH expanded to low pressure level is evaporated in the first evaporator 6, taking up heat from the second coolant circuit 15, 15-1.

Inside the first flow path 7a, there is furthermore formed the low pressure side of the first internal heat exchanger 11-1 between the first evaporator 6 and the compressor 3, so that the refrigerant emerging from the first evaporator 6 upon flowing through the low pressure side of the first internal heat exchanger 11-1 is superheated before it is sucked into the compressor 3. In the first internal heat exchanger 11-1, preferably designed as a counterflow heat exchanger and operated as a supercooler of the refrigerant of the first partial mass flow mH, heat is transferred from the refrigerant of the first partial mass flow mH present at high pressure level to the refrigerant of the first partial mass flow mH present at low pressure level.

The first flow path 7a furthermore comprises an accumulator 13. The accumulator 13, situated in the flow direction of the refrigerant upstream from the compressor 3, especially on the lower pressure side upstream from the first internal heat exchanger 11-1, serves for the separating and collecting of refrigerant liquid.

Consequently, the compressor 3 sucks gaseous refrigerant from the accumulator 13, which is additionally superheated in the first internal heat exchanger 11-1.

Between the branching point 8 and the second expansion element 10 of the second flow path 9a is situated the high pressure side of a second internal heat exchanger 11-2, so that the refrigerant of the second partial mass flow mN is cooled down or supercooled before reaching the second expansion element 10 and is then expanded to intermediate pressure level and supplied to a third refrigerant/coolant heat exchanger 12, operated as a second evaporator. The additional supercooling of the refrigerant of the second partial mass flow mN prior to the expanding and thus prior to the flowing into the second evaporator 12 increases the specific cooling capacity of the second evaporator 12, since the enthalpy of the refrigerant at the inlet to the second evaporator 12 is decreased.

The supercooled refrigerant of the second partial mass flow mN expanded to intermediate pressure level is evaporated in the second evaporator 12, taking up heat from the second coolant circuit 15-2.

Inside the second flow path 9a, there is furthermore formed the intermediate pressure side of the second internal heat exchanger 11-2 between the second evaporator 12 and the compressor 3, so that the refrigerant emerging from the second evaporator 12 upon flowing through the intermediate pressure side of the second internal heat exchanger 11-2 is further superheated before it is injected into the compressor 3 at the intermediate pressure level between two compressor stages.

In the second internal heat exchanger 11-2, preferably designed as a counterflow heat exchanger, heat is transferred from the refrigerant of the second partial mass flow mN present at high pressure level to the refrigerant of the second partial mass flow mN present at intermediate level. The refrigerant of the second partial mass flow mN present at the intermediate pressure level as superheated vapor is supplied to the compressor 3, especially through the intermediate pressure port of the compressor 3, and injected into a compression chamber, which results in the decreasing of the enthalpy at the exit of the compressor 3 and thus to the lowering of the exit temperature of the refrigerant from the compressor 3.

The second coolant circuit 15 is operated as a low temperature circuit or medium temperature circuit, formed from two interconnected or two mutually independent coolant circuits 15-1, 15-2, for example in order to use the coolant of lower temperature circulating in the coolant circuit 15 for the cooling of the intake air for the passenger compartment, the battery, and/or electronic components. Depending on the operating mode of the device 1a, the two second coolant circuits 15-1, 15-2 may be operated either as a low temperature circuit and a medium temperature circuit totally separate from each other or, for example, in a so-called cascade circuit, together with each other. In the cascade circuit, the coolant can flow through the interconnected coolant circuits 15-1, 15-2, wherein the evaporators 6, 12 of the refrigerant are supplied with coolant either serially or one after the other in series, or parallel to each other.

When the device 1a is operating in a cooling mode, the first evaporator 6 operated at a low pressure level of the refrigerant is used for example for the cooling of the intake air for the passenger compartment, while the second evaporator 12 operated at medium pressure level or intermediate pressure level serves for the cooling of the battery, especially a high-voltage battery, or other electronic components. The coolant circulating in the second coolant circuit 15, 15-1 upon flowing through the first evaporator 6 of the refrigeration circuit 2a is cooled down to a temperature of around 0 ° C. and then taken through a coolant/air heat exchanger arranged in an air conditioner and supplied with the intake air. Furthermore, the coolant circulating in the second coolant circuit 15, 15-2 upon flowing through the second evaporator 12 of the refrigeration circuit 2a is cooled down to a temperature in the range of 20 ° C. to 30 ° C.

Since the coolant of the second coolant circuit 15, 15-1, 15-2 is provided in this way at two different temperature levels, it is possible for example on the one hand to cool the battery of an electric vehicle with coolant at a medium temperature level, without using the coolant present at lower temperature level, which is needed principally for the cooling of the intake air of the passenger. On the other hand, the battery can be temperature-controlled to a temperature level corresponding to the optimal operating temperature. In conjunction with the injection technology regarding the refrigerant at an intermediate pressure level and thus the two-stage compression of the refrigerant, a minimum power consumption of the compressor and a maximum cooling capacity and efficiency of the device 1a are realized.

When the device 1a is operating in a heating mode, the heat of the air of the passenger compartment can be transferred in the first evaporator 6 and the heat of the battery or other electronic components can be transferred in the second evaporator 12 from coolant circulating in the second coolant circuit 15, 15-1, 15-2 to the refrigerant. In this way, the air of the passenger compartment and the battery or other electronic components can be used as heat sources for the refrigerant, whereby the waste heat of the battery and the residual heat of the air of the passenger compartment or the ambient air are used as evaporation heat for the refrigerant. The heat transferred to the refrigerant can be transferred in the first refrigerant/coolant heat exchanger 4 to the coolant circulating in the first coolant circuit 14 and then be taken through a coolant/air heat exchanger arranged in the air conditioner and supplied with intake air for the passenger compartment. In the coolant/air heat exchanger, the heat is surrendered to the intake air.

The refrigeration circuit 2a may furthermore comprise an oil separator 16, which is formed between the first flow path 7a and the second flow path 9a, especially between the suction line of the first flow path 7a and the refrigerant line of the injection into the compressor 3. The oil separator 16 is consequently incorporated respectively between the internal heat exchanger 11-1, 11-2 and the inlet to the compressor 3 in the flow path 7a, 9a, so that the oil of the refrigeration circuit 2a can flow from the region at intermediate pressure level to the region at low pressure level. The oil separator 16 comprises an integrated valve for regulating the pressure and the oil volume, or for regulating the flow rate.

Figure 3:
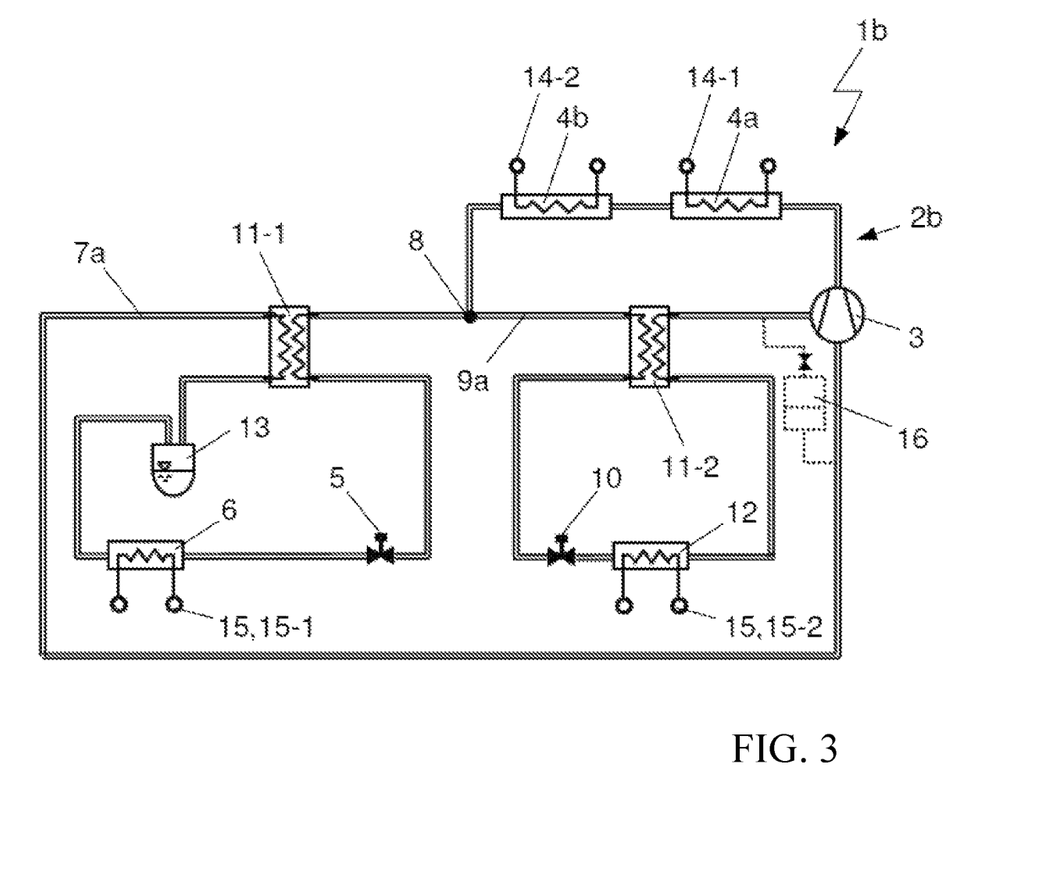
FIG. 3: a device per FIG. 2A having an additional coolant circuit and a refrigeration circuit with two separate refrigerant/coolant heat exchangers, operated as a condenser/gas cooler.

FIG. 3 shows a device 1b similar to the device la of FIG. 2A, but with an additional coolant circuit 14-2 as the high temperature circuit and a refrigeration circuit 2b with two separate refrigerant/coolant heat exchangers 4a, 4b operated as a condenser/gas cooler.

The major difference between the device 1b and the device 1a of FIG. 2A is the configuration of the first refrigerant/coolant heat exchanger 4 of the refrigeration circuits 2a, 2b, operated as a condenser/gas cooler, which in the configuration of the refrigeration circuit 2b comprises two independent components and thus a first refrigerant/coolant heat exchanger 4a operated as a condenser/gas cooler and a second, fourth refrigerant/coolant heat exchanger 4b operated as a condenser/gas cooler. The first refrigerant/coolant heat exchanger 4a is operated as a primary condenser/gas cooler of a primary first coolant circuit 14-1 and the fourth refrigerant/coolant heat exchanger 4b is operated as a secondary condenser/gas cooler of a secondary first coolant circuit 14-2. The primary first coolant circuit 14-1 and the secondary first coolant circuit 14-2 are designed as two coolant circuits 14-1, 14-2 which can operate independently of each other or for example in a so-called cascade circuit. In the cascade circuit, the coolant can flow through the interconnected coolant circuits 14-1, 14-2, wherein the refrigerant/coolant heat exchangers 4a, 4b are supplied with coolant either serially or one after the other in series, or parallel to each other.

The primary first coolant circuit 14-1 serves for the transfer of a large heating capacity from the refrigerant to the coolant, which in turn can be used for the heating of the intake air for the passenger compartment. The secondary first coolant circuit 14-2 serves for the transfer of a lesser heating capacity from the refrigerant to the coolant, which can be used for the heating of the battery or other electronic components. The temperature level of the coolant circulating in the primary first coolant circuit 14-1 is higher than the temperature level of the coolant circulating in the secondary first coolant circuit 14-2.

Thanks to the use of two separate condensers/gas coolers 4a, 4b, heat can be transferred from the refrigerant to the coolant circulating in the primary first coolant circuit 14-1, from the refrigerant to the coolant circulating in the secondary first coolant circuit 14-2 or from the refrigerant to the coolant circulating in primary first coolant circuit 14-1 and that in the secondary first coolant circuit 14-2 or from the coolant circulating in the primary first coolant circuit 14-1 to the coolant circulating in the secondary first coolant circuit 14-2.

Thus, the coolant when the device 1b is operated in the refrigeration mode can be taken on the one hand preferably serially and in counterflow through the condensers/gas coolers 4a, 4b, in order to transfer maximum heat from the refrigerant to the coolant. On the other hand, the coolant circuits 14-1, 14-2 when operating in the heating mode, also known as the heat pump mode, can be operated entirely separate from each other, in order to make coolant available at different temperature levels for the particular application.

Figure 4A:
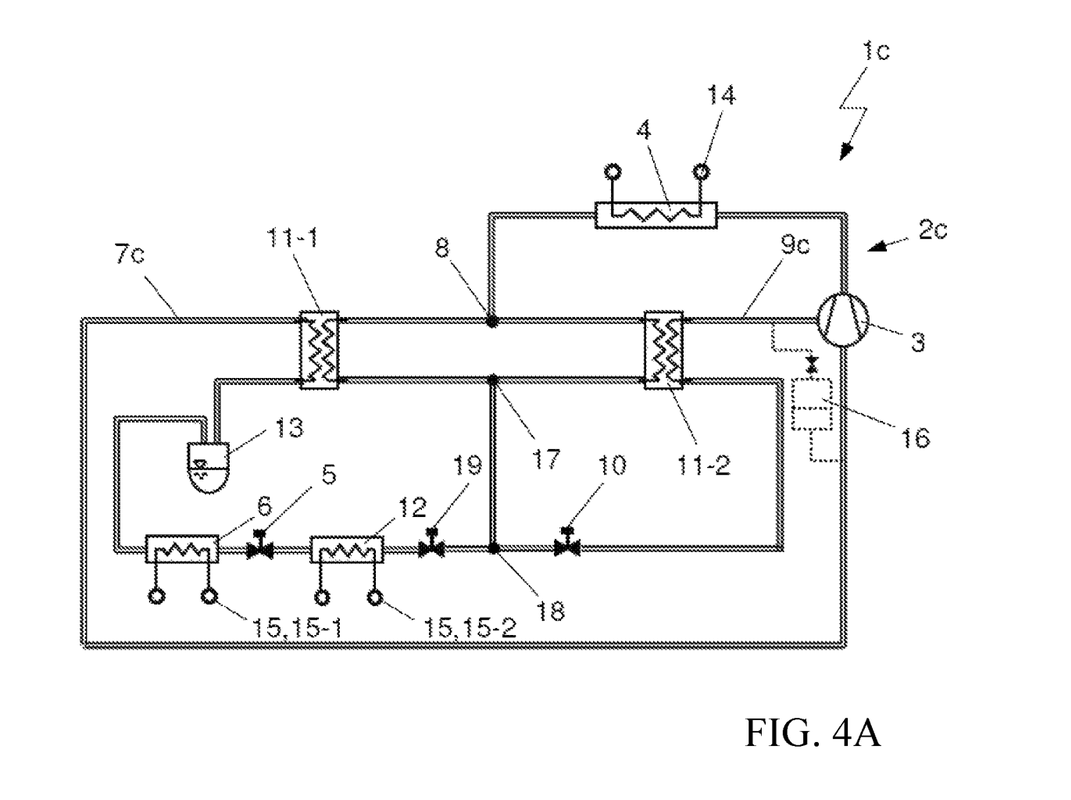
FIG. 4A: a device similar to the device of FIG. 2A having a refrigeration circuit, in which the refrigerant/coolant heat exchangers operated as an evaporator are hooked up in series with each other.
Figure 4B:
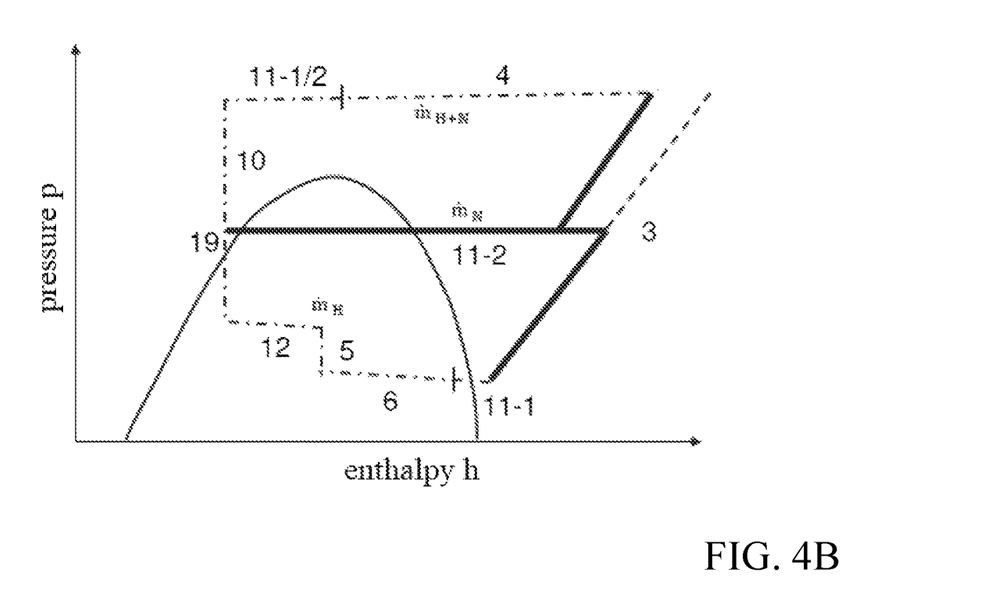
FIG. 4B: a pressure vs. enthalpy diagram for the operation of the refrigeration circuit of FIG. 4a in a transcritical process of the refrigerant.

FIG. 4A shows a device 1c, similar to the device la of FIG. 2A, having a refrigeration circuit 2c in which the refrigerant/coolant heat exchangers 6, 12 operated as an evaporator are hooked up in series with each other and thus receive the flow of refrigerant in succession. The device 1c for a climate control system of a motor vehicle is consequently formed with a refrigeration circuit 2c with two-stage compression and injection of the refrigerant into the compressor 3 at an intermediate pressure level as well as having two internal heat exchangers 11-1, 11-2. The device 1c furthermore comprises the first coolant circuit 14 and the second coolant circuit 15, which are respectively thermally connected across the refrigerant/coolant heat exchangers 4, 6, 12 to the refrigeration circuit 2c and can be operated independently of each other. FIG. 4B shows in turn a pressure vs. enthalpy diagram for the operation of the refrigeration circuit 2c of FIG. 4A in a transcritical process of the refrigerant.

The major difference between the devices 1c of FIG. 4A and the device la of FIG. 2A is the configuration of the refrigeration circuits 1c, 1a. The coolant circuits 14, 15, 15-1, 15-2 are unchanged. Also, the operating modes of the coolant circuits 14, 15, 15-1, 15-2 are the same, so that reference is made here to the remarks about the device 1a.

The refrigeration circuit 2c comprises, in the flow direction of the refrigerant, the compressor 3 and the first refrigerant/coolant heat exchanger 4 operated as a condenser/gas cooler, which is designed as a thermal connection between the refrigeration circuit 2c and the first coolant circuit 14. The desuperheating heat or the heat of condensation or the heat of liquefaction transferred in the refrigerant/coolant heat exchanger 4 from the refrigerant to the coolant circulating in the first coolant circuit 14, operated as a high temperature circuit, is either transferred to the ambient air or used for heating the intake air for the passenger compartment, the battery, and/or electronic components, depending on the operating mode of the device 1c.

At the branching point 8 situated downstream from the outlet of the first refrigerant/coolant heat exchanger 4 in the flow direction of the refrigerant, the liquid refrigerant emerging from the condenser/gas cooler 4 at high pressure level is divided into two partial mass flows, a first partial mass flow flowing to the high pressure side of the first internal heat exchanger 11-1 and a second partial mass flow being taken to the high pressure side of the second internal heat exchanger 11-2. Upon flowing through the internal heat exchangers 11-1, 11-2, the refrigerant is further cooled down or supercooled. After the emerging of the partial mass flows from the internal heat exchangers 11-1, 11-2, the partial mass flows are again mixed at the discharge point 17 and taken to the second branching point 18.

At the second branching point 18, the liquid refrigerant is in turn divided into two partial mass flows, the first partial mass flow $m_H$ flowing through the first flow path 7c and the second partial mass flow $m_N$ through the second flow path 9c. The second refrigerant/coolant heat exchanger 6 operated as the first evaporator and the corresponding first expansion element 5 situated upstream from the first evaporator 6 in the flow direction of the refrigerant as well as a corresponding third expansion element 19 situated upstream from the second evaporator 12 in the flow direction of the refrigerant are arranged inside the first flow path 7c, which extends from the second branching point 18 to the inlet of the compressor 3. The evaporators 6, 12 are supplied with refrigerant in succession in the series of the second evaporator 12 and the first evaporator 6 respectively with the upstream expansion element 19, 5. The evaporators 6, 12 are hooked up in series. Inside the second flow path 9c is formed the second expansion element 10. The partial mass flows mH, mN through the respective flow path 7c, 9c are controlled with the corresponding second expansion element 10 and the third expansion element 19. The expansion elements 5, 10, 19 are preferably designed as expansion valves.

Upon flowing through the third expansion element 19 situated inside the first flow path 7c, the cooled or supercooled refrigerant of the first partial mass flow mH is expanded to a first evaporation pressure level and taken to the second evaporator 12. The supercooled refrigerant of the first partial mass flow mH expanded to the first evaporation pressure level is at least partly evaporated in the second evaporator 12, taking up heat from the second coolant circuit 15, 15-2. After this, the refrigerant upon flowing through the first expansion element 5 is expanded to a second evaporation pressure level or the low-pressure level and taken to the first evaporator 6. The refrigerant of the first partial mass flow mH expanded to the low-pressure level is evaporated in the first evaporator 6, taking up heat from the second coolant circuit 15, 15-1.

According to an alternative mode of operation, not shown in the pressure vs. enthalpy diagram for the operation of the refrigeration circuit 2c in FIG. 4A, the first expansion element 5 is entirely opened, so that the evaporators 6, 12 are supplied with refrigerant at a common pressure level. Upon flowing through the third expansion element 19, the refrigerant is expanded to the low-pressure level.

Inside the first flow path 7c, there is furthermore formed the low pressure side of the first internal heat exchanger 11-1 between the first evaporator 6 and the compressor 3, so that the refrigerant emerging from the first evaporator 6 upon flowing through the low pressure side of the first internal heat exchanger 11-1 is superheated before it is sucked into the compressor 3. In the first internal heat exchanger 11-1, preferably designed as a counterflow heat exchanger heat is transferred from the refrigerant present at high pressure level to the refrigerant of the first partial mass flow mH present at low pressure level.

The first flow path 7c of the refrigeration circuit 2c of the device 1c furthermore comprises an accumulator 13, which is situated in the flow direction of the refrigerant upstream from the compressor 3, especially on the lower pressure side upstream from the first internal heat exchanger 11-1, and serves for the separating and collecting of refrigerant liquid. Consequently, the compressor 3 sucks gaseous refrigerant from the accumulator 13, which is additionally superheated in the first internal heat exchanger 11-1.

Inside the second flow path 9c, there is furthermore formed the intermediate pressure side of the second internal heat exchanger 11-2 between the second expansion element 10 and the compressor 3, so that the cooled or supercooled refrigerant of the second partial mass flow mN upon flowing through the second expansion element 10 at the intermediate pressure level is expanded and upon flowing through the intermediate pressure side of the second internal heat exchanger 11-2 it is evaporated, taking up heat of the refrigerant at the high pressure side, before it is injected into the compressor 3 at the intermediate pressure level between two compressor stages. In the second internal heat exchanger 11-2, preferably designed as a counterflow heat exchanger, heat is transferred from the refrigerant present at high pressure level to the refrigerant of the second partial mass flow mN present at intermediate level. The refrigerant of the second partial mass flow mN present at the intermediate pressure level as superheated vapor is supplied to the compressor 3, especially through the medium pressure port of the compressor 3, and injected into a compression chamber.

The refrigeration circuit 2c may furthermore comprise an oil separator 16, which is formed between the first flow path 7c and the second flow path 9c, especially between the suction line of the first flow path 7c and the refrigerant line of the injection into the compressor 3. With the oil separator 16 incorporated respectively between the internal heat exchanger 11-1, 11-2 and the inlet to the compressor 3 in the flow path 7c, 9c, the oil of the refrigeration circuit 2c can flow from the region at intermediate pressure level to the region at low pressure level, the oil separator 16 being designed with an integrated valve for regulating the pressure and the oil volume, or for regulating the flow rate.

Figure 5:
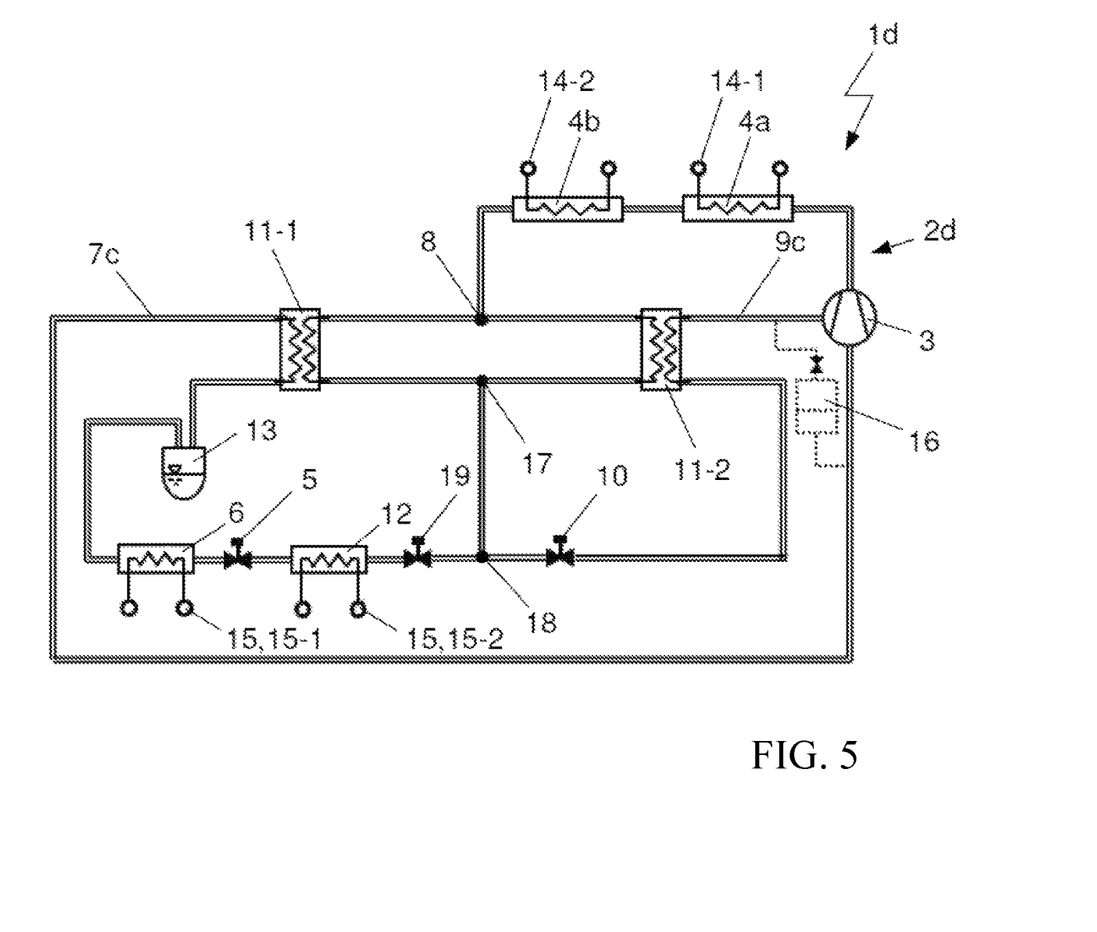
FIG. 5: a device per FIG. 4A having an additional coolant circuit and a refrigeration circuit with two separate refrigerant/coolant heat exchangers operated as a condenser/gas cooler.

FIG. 5 shows a device 1d similar to the device 1c of FIG. 4A, with an additional coolant circuit 14-2 as the high temperature circuit and a refrigeration circuit 2d with two separate refrigerant/coolant heat exchangers 4a, 4b operated as a condenser/gas cooler.

The major difference between the device 1d and the device 1c of FIG. 4A is, as with the comparison of the devices 1a, 1b of FIG. 2A and FIG. 3, the configuration of the first refrigerant/coolant heat exchanger 4 of the refrigeration circuit 2c, 2d, operated as a condenser/gas cooler, which in the configuration of the refrigeration circuit 2d comprises two independent components, and thus a first refrigerant/coolant heat exchanger 4a operated as a condenser/gas cooler, also used as the primary condenser/gas cooler of a primary first coolant circuit 14-1, and a second, fourth refrigerant/coolant heat exchanger 4b operated as a condenser/gas cooler, also used as a secondary condenser/gas cooler of a secondary first coolant circuit 14-2. The primary first coolant circuit 14-1 and the secondary first coolant circuit 14-2 are designed as two coolant circuits which can be operated independently or each other or in a cascade.

The refrigeration circuits 2a, 2b, 2c, 2d of the devices 1a, 1b, 1c, 1d are designed to operate preferably with carbon dioxide as refrigerant, known as R744 for short, but they may also be operated with other refrigerants, such as R1234yf or R134a.

LIST OF REFERENCE NUMBERS

1a, 1b, 1c, 1d, 1' device
2a, 2b, 2c, 2d, 2' refrigeration circuit
3 compressor
4, 4a, 4' heat exchanger, (first) condenser/gas cooler, first refrigerant/coolant heat exchanger
4b second condenser/gas cooler, fourth refrigerant/coolant heat exchanger 5 first expansion element
6, 6' heat exchanger, (first) evaporator, second refrigerant/coolant heat exchanger
7a, 7c, 7' first flow path
8, 8' (first) branching point
9a, 9c, 9' second flow path
10 second expansion element
11' internal heat exchanger
11-1 first internal heat exchanger
11-2 second internal heat exchanger
12 heat exchanger, second evaporator, third refrigerant/coolant heat exchanger
13 accumulator
14, 14-1 first (primary) coolant circuit
14, 14-2 first secondary coolant circuit
15, 15-1 second primary coolant circuit
15, 15-2 second secondary coolant circuit
16 oil separator
17 discharge point
18 second branching point
19 third expansion element

What is claimed is:

1. A device for a climate control system of a motor vehicle, comprising:
a refrigeration circuit with a compressor for two-stage compression of a refrigerant and injection of the refrigerant at an intermediate pressure level;
at least one heat exchanger operated as a condenser/gas cooler;
a first internal heat exchanger;
at least one first heat exchanger operated as an evaporator arranged downstream from a first expansion element in a flow direction of the refrigerant; and
a first flow path and a second flow path, each of the first flow path and the second flow path extending from a branching point to the compressor, wherein the refrigeration circuit is formed with a second internal heat exchanger, the first internal heat exchanger arranged at least with a low pressure side inside the first flow path, and the second internal heat exchanger arranged at least with an intermediate pressure side inside the second flow path, wherein a first coolant circuit is formed, which is thermally connected to the refrigeration circuit across the heat exchanger operated as the condenser/gas cooler of the refrigerant, wherein the heat exchanger is a refrigerant/coolant heat exchanger, wherein a second coolant circuit is formed, which is thermally connected to the refrigeration circuit across the first heat exchanger operated as the evaporator of the refrigerant and/or a second heat exchanger operated as an evaporator of the refrigerant, and wherein the first heat exchanger operated as the evaporator of the refrigerant and/or the second heat exchanger operated as the evaporator of the refrigerant are designed as a refrigerant/coolant heat exchanger.

2. The device according to claim 1, wherein the first heat exchanger operated as an evaporator and the first expansion element situated upstream from the first heat exchanger in the flow direction of the refrigerant are formed inside the first flow path, the first heat exchanger operated as an evaporator arranged upstream from the low pressure side of the first internal heat exchanger in the flow direction of the refrigerant.

3. The device according to claim 1, wherein
the branching point of the first flow path and the second flow path of the refrigeration circuit at an outlet of the heat exchanger operated as a condenser/gas cooler is designed such that a high pressure side of the first internal heat exchanger is situated inside the first flow path and a high pressure side of the second internal heat exchanger is situated inside the second flow path of the refrigeration circuit, or
the branching point of the first flow path and the second flow path of the refrigeration circuit is situated downstream from outlets of high-pressure sides of the first internal heat exchanger and the second internal heat exchanger.

4. The device according to claim 1, wherein an accumulator for separating and collecting a refrigerant liquid is situated inside the first flow path of the refrigeration circuit at the low pressure side, upstream from the compressor in the flow direction of the refrigerant.

5. The device according to claim 1, wherein the refrigeration circuit further comprises an oil separator formed between the first flow path and the second flow path.

6. The device according to claim 1, characterized in that the first coolant circuit is designed with a coolant/air heat exchanger for transfer of heat to surrounding air or to intake air for a passenger compartment.

7. The device according to claim 1, wherein the second coolant circuit comprises a primary second coolant circuit and a secondary second coolant circuit.

8. The device according to claim 1, wherein the second coolant circuit is designed with a coolant/air heat exchanger for transfer of heat from surrounding air or intake air for a passenger compartment to the coolant.

9. The device according to claim 1, wherein the refrigeration circuit includes a second expansion element arranged upstream from the second heat exchanger in the flow direction of the refrigerant.

10. The device according to claim 9, wherein the second heat exchanger of the refrigeration circuit operated as an evaporator and the second expansion element arranged upstream from the second heat exchanger in the flow direction of the refrigerant are formed inside the second flow path, the second heat exchanger operated as an evaporator arranged upstream from the intermediate pressure side of the second internal heat exchanger in the flow direction of the refrigerant.

11. A method for operating the device for the climate control system of the motor vehicle according to claim 1, wherein the climate control system conditions the air of a passenger compartment and controls a temperature of components of a drive train of the motor vehicle, wherein the refrigerant circulating in the refrigeration circuit is compressed in the compressor in two stages from a low pressure level to a high pressure level, wherein a partial mass flow of vaporous refrigerant at an intermediate pressure level is injected into the compressor, wherein the refrigerant flowing out from the heat exchanger operated as a condenser/gas cooler is divided into two high pressure level partial mass flows at the branching point, wherein each time the first partial mass flow of the refrigerant present at the high pressure level is taken through the first internal heat exchanger and the second partial mass flow of the refrigerant present at the high pressure level is taken through the second internal heat exchanger, heat is transferred in the first internal heat exchanger to the refrigerant present at the low pressure level and heat is transferred in the second internal heat exchanger to the refrigerant present at the intermediate pressure level.

12. The method for operating the device according to claim 11, wherein the refrigerant taken through the first internal heat exchanger as the first partial mass flow at the high pressure level is expanded to the low pressure level and upon flowing through the first heat exchanger operated as an evaporator it is evaporated, taking up heat, and then it is taken through the first internal heat exchanger.

13. The method for operating the device according to claim 11, wherein the refrigerant taken through the second internal heat exchanger as the second partial mass flow at high pressure level is expanded to the intermediate pressure level and upon flowing through a second heat exchanger operated as an evaporator it is evaporated, taking up heat, and then it is taken through the second internal heat exchanger.

14. The method for operating the device according to claim 11, wherein the branching point is a first branching point and the refrigerant flowing out from the first internal heat exchanger and the second internal heat exchanger as partial mass flows at the high pressure level is mixed and then divided at a second branching point into two partial mass flows, wherein the first partial mass flow of the refrigerant divided at the second branching point is expanded to the low pressure level and evaporated, taking up heat, upon flowing through the first heat exchanger operated as an evaporator and a second heat exchanger operated as an evaporator and then it is taken through the first internal heat exchanger.

15. The method for operating the device according to claim 11, wherein, when the climate control system is operated in a heating mode, at least one heating capacity is provided, wherein heat from the refrigerant of the refrigeration circuit is transferred in the at least one heat exchanger operated as a condenser/gas cooler to a coolant circulating in the first coolant circuit and heat from the coolant of the first coolant circuit is transferred in a coolant/air heat exchanger to an intake air for the passenger compartment and/or heat is transferred to the components of the drive train.

16. The method for operating the device according to claim 11, wherein, when the climate control system is operated in a refrigeration mode, a cooling capacity is provided, wherein heat from a coolant circulating in a second coolant circuit is transferred in the first heat exchanger or the second heat exchanger operated as the evaporator to the refrigerant of the refrigeration circuit and heat from the air of the passenger compartment is transferred in a coolant/air heat exchanger to the coolant of the second coolant circuit.

17. The method for operating the device according to claim 11, wherein, when the climate control system is operated in a refrigeration mode, a cooling capacity is provided, wherein heat from a coolant circulating in the second coolant circuit is transferred in the first heat exchanger or the second heat exchanger operated as the evaporator to the refrigerant of the refrigeration circuit and heat from the components of the drive train is transferred to the coolant of the second coolant circuit.

18. The method for operating the device according to claim 11, wherein the branching point is a first branching point and the refrigerant flowing out from the first internal heat exchanger and the second internal heat exchanger as partial mass flows at the high pressure level is mixed and then divided at a second branching point into two partial mass flows, wherein the first partial mass flow of the refrigerant divided at the second branching point is expanded to the intermediate pressure level and at least partly evaporated, taking up heat, upon flowing through a second heat exchanger operated as an evaporator and then it is expanded to low pressure level and evaporated, taking up heat, upon flowing through the first heat exchanger operated as an evaporator and then it is taken through the first internal heat exchanger.

19. The method for operating the device according to claim 18, wherein the second partial mass flow of the refrigerant divided at the second branching point flow is expanded to intermediate pressure level and then taken through the second internal heat exchanger.

20. A device for a climate control system of a motor vehicle, comprising:
a refrigeration circuit with a compressor for two-stage compression of a refrigerant and injection of the refrigerant at an intermediate pressure level;
at least one heat exchanger operated as a condenser/gas cooler;
a first internal heat exchanger;
at least one first heat exchanger operated as an evaporator arranged downstream from a first expansion element in a flow direction of the refrigerant and
a first flow path and a second flow path, each of the first flow path and the second flow path extending from a branching point to the compressor, wherein the refrigeration circuit is formed with a second internal heat exchanger, the first internal heat exchanger arranged at least with a low pressure side inside the first flow path, and the second internal heat exchanger arranged at least with an intermediate pressure side inside the second flow path, wherein the refrigeration circuit includes a second heat exchanger operated as an evaporator, a second expansion element arranged upstream from the second heat exchanger in the flow direction of the refrigerant, wherein the first heat exchanger operated as an evaporator and the first expansion element situated upstream from the first heat exchanger in the flow direction of the refrigerant as well as the second heat exchanger operated as an evaporator and the second expansion element situated upstream from the second heat exchanger in the flow direction of the refrigerant are formed inside the first flow path of the refrigeration circuit, wherein the second heat exchanger operated as an evaporator with the second expansion element in the flow direction of the refrigerant is situated upstream from the first heat exchanger operated as an evaporator with the upstream first expansion element and the first heat exchanger operated as an evaporator is situated upstream from the low pressure side of the first internal heat exchanger in the flow direction of the refrigerant.

21. The device according to claim 20, wherein a third expansion element is formed inside the second flow path of the refrigeration circuit.

22. A device for a climate control system of a motor vehicle, comprising:
a refrigeration circuit with a compressor for two-stage compression of a refrigerant and injection of the refrigerant at an intermediate pressure level;
at least one heat exchanger operated as a condenser/gas cooler;
a first internal heat exchanger;
at least one first heat exchanger operated as an evaporator arranged downstream from a first expansion element in a flow direction of the refrigerant and
a first flow path and a second flow path, each of the first flow path and the second flow path extending from a branching point to the compressor, wherein the refrigeration circuit is formed with a second internal heat exchanger, the first internal heat exchanger arranged at least with a low pressure side inside the first flow path, and the second internal heat exchanger arranged at least with an intermediate pressure side inside the second flow path, wherein the branching point of the first flow path and the second flow path of the refrigeration circuit at an outlet of the heat exchanger operated as a condenser/gas cooler is designed such that a high pressure side of the first internal heat exchanger is situated inside the first flow path and a high pressure side of the second internal heat exchanger is situated inside the second flow path of the refrigeration circuit, or the branching point of the first flow path and the second flow path of the refrigeration circuit is situated downstream from outlets of high-pressure sides of the first internal heat exchanger and the second internal heat exchanger, wherein the branching point is a first branching point situated on an outlet of the heat exchanger operated as a condenser/gas cooler and a discharge point situated downstream from the first branching point in the flow direction of the refrigerant are designed such that a first partial mass flow is taken to the high pressure side of the first internal heat exchanger and a second partial mass flow is taken to the high pressure side of the second internal heat exchanger, which are merged after flowing out from the first internal heat exchanger and the second internal heat exchanger at the discharge point, wherein a second branching point of the first flow path and the second flow path is situated downstream from the discharge point in the flow direction of the refrigerant.

23. A device for a climate control system of a motor vehicle, comprising:
- a refrigeration circuit with a compressor for two-stage compression of a refrigerant and injection of the refrigerant at an intermediate pressure level;
- at least one heat exchanger operated as a condenser/gas cooler;
- a first internal heat exchanger;
- at least one first heat exchanger operated as an evaporator arranged downstream from a first expansion element in a flow direction of the refrigerant and
- a first flow path and a second flow path, each of the first flow path and the second flow path extending from a branching point to the compressor, wherein the refrigeration circuit is formed with a second internal heat exchanger, the first internal heat exchanger arranged at least with a low pressure side inside the first flow path, and the second internal heat exchanger arranged at least with an intermediate pressure side inside the second flow path, wherein a first coolant circuit comprises a primary first coolant circuit and a secondary first coolant circuit, each thermally connected across a heat exchanger of the at least one heat exchanger operated as a condenser/gas cooler of the refrigerant to the refrigeration circuit, wherein the heat exchangers are each a refrigerant/coolant heat exchanger.

* * * * *